Sept. 6, 1960 N. HAENEL 2,951,653

SPOOL-DRIVING MECHANISM IN MAGNETIC TAPE RECORDERS

Filed Oct. 31, 1958 2 Sheets-Sheet 1

INVENTOR
Nisso Haenel
By Holcombe Wetherill & Brisebois
ATTORNEYS

SPOOL-DRIVING MECHANISM IN MAGNETIC TAPE RECORDERS

Filed Oct. 31, 1958 2 Sheets-Sheet 2

INVENTOR
Nisso Haenel
By Holcombe, Wetherill & Brisebois
ATTORNEYS 2,951,653

SPOOL-DRIVING MECHANISM IN MAGNETIC TAPE RECORDERS

Nisso Haenel, Paris, France, assignor to Societe Electromag, Paris, France, a corporation of France Filed Oct. 31, 1958, Ser. No. 770,975

Claims priority, application France Nov. 4, 1957

3 Claims. (Cl. 242—55.12)

This invention relates to a spool-driving mechanism in a magnetic tape recorder. The invention is concerned with the problem of obtaining different modes of movement of the recording tape, for example forward movement at high speed or at low speed, as desired, and also reverse movement at high speed.

According to the present invention there is provided a spool-driving mechanism in a magnetic tape recorder, comprising an electric motor, a shaft projecting from one end of the motor, mounting means for the motor which will permit limited displacement of said motor in such manner that said one end moves in a direction transverse to the axis of the shaft, control means for displacing the motor as aforesaid between first and second positions, first and second rotary carriers for spools of magnetic tape, first transmission means for transmitting drive from the motor shaft to the first carrier when the motor is in the first position, whereby the first carrier is driven in a particular direction, and second transmission means which transmit drive from the motor shaft to the second carrier and cause it to rotate in the opposite direction when the motor is in the second position.

For a better understanding of the invention and to show how the same may be carried into effect, reference will now be made to the accompanying drawings in which.

Figure 1:
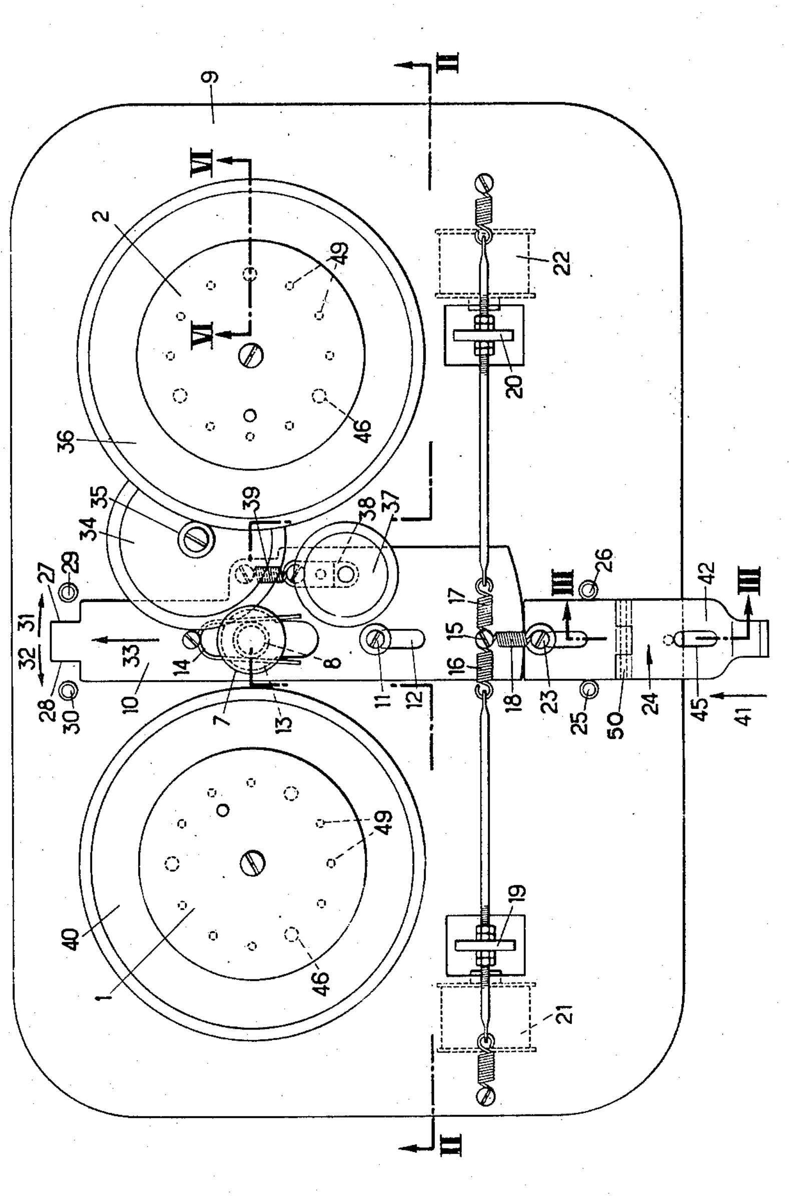
Figure 1 is a diagrammatic view of magnetic tape recorder, as seen from above.
Figures 3, 4, 5:
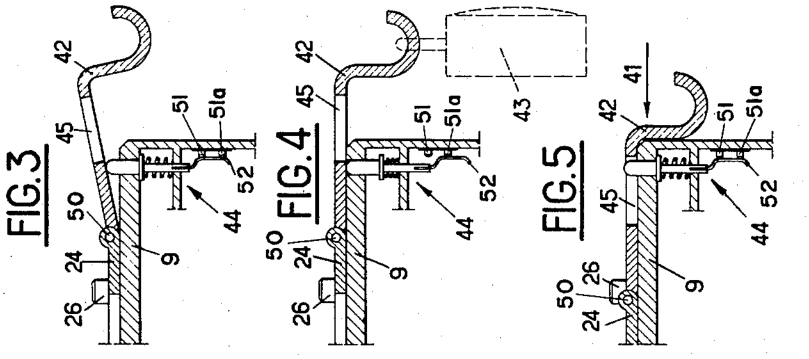
Figures 2, 6:
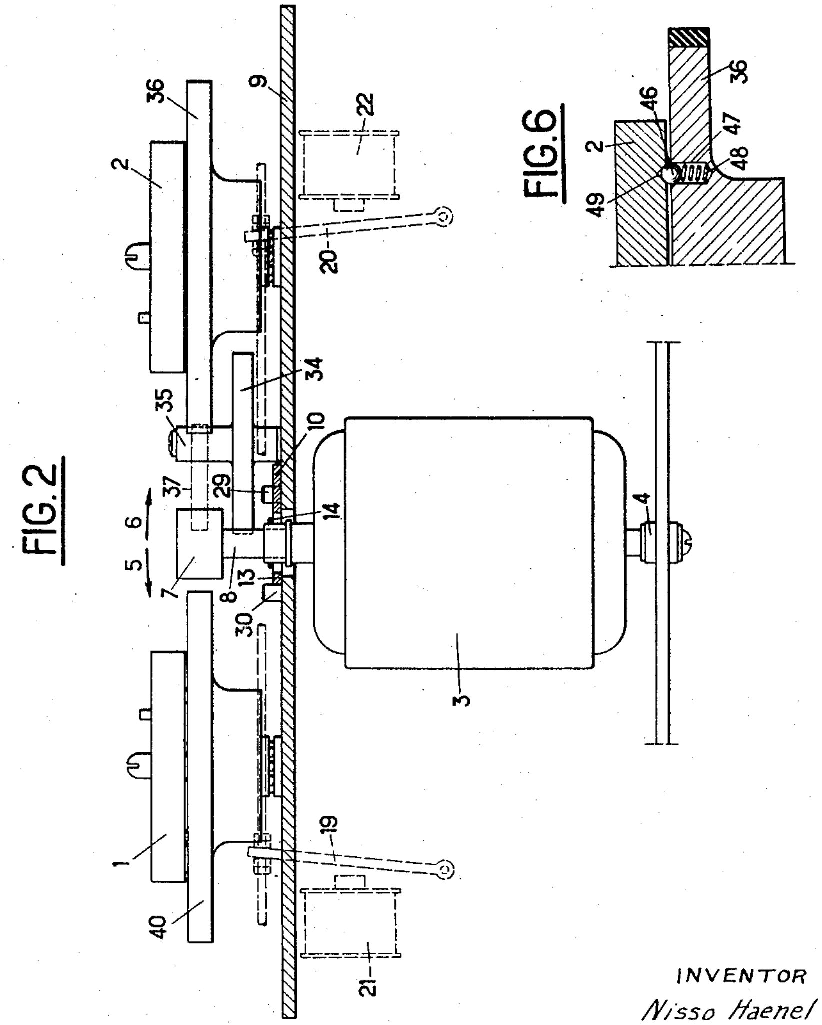
Figure 2 is a part sectional view taken along the line II—II of Figure 1.

Figure 3 shows a section taken along the line III—III of Figure 1 and illustrates the end of a control device, Figure 4 is a section corresponding to Figure 3 showing the position adopted by the end of the control device when a microphone is suspended therefrom, Figure 5 corresponds to Figure 3, but in this case the end of the control device has been depressed, Figure 6 is a diagrammatic section through a rotary carrier for a spool of tape, the section being taken along the line VI—VI of Figure 1.

The drawing shows a rotary carrier 1 for the feed spool and a rotary carrier 2 for the receiving spool. These are to be driven as desired by a motor 3 which has a lower support column passing through two rubber rings 4, one on each side of a supporting plate for the motor. This mounting arrangement permits the motor to rock bodily about a position of equilibrium, namely the position in which the shaft 8 of the motor is vertical, as indicated by the arrows 5 and 6. The motor has a cylindrical roller 7 at the end of its shaft 8.

The deck of the tape recorder is indicated by 9 and on it is mounted a lever 10, this being effected with the aid of screw 11 which passes through a slot 12 in the lever 10 and into the deck. Thus, the lever 10 is adapted to rock about the screw 11 and also to slide horizontally relative to the deck 9. The lever 10 is also formed with a hole 13 through which passes the shaft 8 of the motor. The shape of the hole 13 is similar to that of a keyhole. A spring in the shape of a fork 14 is secured to the lever 10 and its limbs bear one on each side of the shaft 8 such that it tends to hold the shaft of the motor in the centre of the circular portion of the hole 13.

A screw 15 passes into the lever 10 and serves to anchor three springs 16, 17 and 18 which are respectively connected to the armatures 19 and 20 of two electromagnets 21 and 22, by rods, and to a screw 23 which passes through a slot in a control device 24 and into the deck 9. The screw 23 serves as a guide for the control device 24, which consists of two parts and which is operated in the manner of a push-button by being pushed in the direction of the arrow 41, whereby the lever 10 is moved in the direction of the arrow 33. The device 24 is further guided by two pins 25 and 26 which project upwardly from the deck 9.

The opposite end of the lever 10 is formed with two notches 27 and 28 disposed near two pins 29 and 30 projecting from the deck. When the lever 10 has previously been displaced in the sense of the arrow 33, the sides thereof are between and close to the pins 29 and 30, which therefore prevent the lever 10 from rocking in the direction of the arrow 31 or 32. When the lever 10 has previously been rocked in the direction of the arrow 31 or 32, one of the pins 29, 30 will project into the corresponding notch 27 or 28 and this prevents the displacement of the lever 10 under the action of the device 24 in the direction of the arrow 33.

A rubber-tired roller 34 is mounted so as to turn freely about a pin which projects upwardly from the deck 9. Integral with the roller 34 is a hollow shaft 35 which makes driving contact with a rubber-tired wheel 36 upon which is mounted the carrier 2 for the receiving spool. A further loosely-running rubber-tired roller 37 is mounted on one end of a lever 38 which is pivotally connected at the middle to the lever 10 and is subjected to the action of a recoil spring 39 which is attached to its other end. The carrier 1 for the feed spool is mounted upon a rubber-tired wheel 40.

It will now be apparent that, if neither of the electromagnets 21 and 22 is energised, and if no pressure is exerted on the control device 24, the roller 7 on the motor shaft will not contact any rotating element and the two rotary carriers 1, 2 will not be driven.

If, with the aid of an electric contactor (not shown), the electro-magnet 22 is energised, thus effecting attraction of the armature 20, the lever 10 rocks about the screw 11 in the direction of the arrow 32 and brings about the rocking of the motor in the direction of the arrow 5 (Figure 2). The roller 7 then contacts the wheel 40 and drives the carrier 1 for the feed spool at high speed in the rewinding direction.

If, on the contrary, the electro-magnet 21 is energised without energising the electro-magnet 22, the lever 10 rocks in the direction of the arrow 31 and applies the shaft 8 of the motor against the roller 34 which, in turn and through the intermediary of its shaft 35 drives the wheel 36 upon which is mounted the carrier 2 for the feed spool, which then rotates in the winding direction at the much lower speed necessary for recording or restoration. The reduction of the speed is obtained by the interposition of the roller 34 and its shaft 35. The direction of rotation of the carrier 2 when the electromagnet 21 is energised is opposite to the direction of rotation of the carrier 1 when the electromagnet 22 is energised.

If, without having energised either of the electromagnets 21 or 22, the control device 24 is pushed to move the lever 10 in the direction of the arrow 33, whereby the pins 29 and 30 prevent any rocking movement of the lever 10, the roller 37 becomes interposed between the roller 7 and the wheel 36 which then rotates the receiving spool at high speed in the winding direction.

It should be noted that when the lever 10 is displaced in the direction of the arrow 33, the shaft 8 of the motor adopts a position in the narrow portion of the hole 13, the effect of which is that the shaft of the motor is supported and the roller 7 is prevented from being pushed into contact with the wheel 40 by the roller 37.

As shown in Figures 3, 4 and 5, the control device 24 consists of two parts, of which one part 42 is pivoted at 50 to the other part and formed as a hook upon which the microphone 43 is hung, as illustrated in Figure 4. Under the action of the weight of the microphone 43, the hook part 42 actuates a plunger 44 which carries a contact strip 52 that serves to bridge two contacts 51, 51*a*, in the feed circuit of the recording apparatus. Thus this circuit is broken by the simple act of placing the microphone on the hook. A slot 45 is formed in the hook portion 42 so that when pressure is exerted on the control device 24 for the purpose of initiating the high-speed winding of the receiving spool, the plunger 44 is not depressed sufficiently to break the feed circuit but, instead, its upper end enters the slot 45.

Figure 6 shows how the rotary carriers 1 and 2 for the spools of magnetic tape are coupled to the wheels 36 and 40. In this Figure the carrier 2 is shown coupled to the wheel 36 through the intermediary of three balls 46 which are disposed in respective cavities 47 and are urged upwardly by springs 48. The balls also engage in cavities 49 formed in the plate 2. As long as the torque exerted by the tape on the carrier 2 does not exceed a certain value, the force exerted by the springs 48 is sufficient to maintain the balls 46 in the cavities 49. On the other hand, if the torque reaches an excessively high value, the balls 46 are depressed, against the action of the springs 48, and thereafter roll on the under side of the carrier 2, which is then uncoupled from the wheel 36. When this happens, a characteristic sound, warning the operator that the end of the tape has been reached, is produced. This device also prevents breakage of the magnetic film which could otherwise take place in consequence of an excessively high tension in the tape, as produced, for example, at the end of the unwinding process.

What I claim is:

1. A spool-driving mechanism in a magnetic tape recorder, comprising an electric motor, a shaft projecting from one end of the motor, mounting means for the motor which will permit limited displacement of said motor in such manner that said one end moves in a direction transverse to the axis of the shaft, a rockably mounted control lever for displacing the motor as aforesaid between first and second positions, first and second rotary carriers for spools of magnetic tape, mounting means for the control lever which permit it to slide bodily with respect to the motor and the rotary carriers between one position and another position, stop means which permit the control lever to rock as aforesaid when it is in said one position and which prevent it from rocking and cause the motor to be held between said first and second positions when the control lever is in said other position, first transmission means for transmitting drive from the motor shaft to the first carrier when the motor is in the first position, whereby the first carrier is driven in a particular direction, and second transmission means which transmit drive from the motor shaft to the second carrier and cause it to rotate in the opposite direction when the motor is in the second position, said second transmission means comprising a roller mounted on said control lever and transmission means for transmitting drive between the motor shaft and the roller and between the roller and the second rotary carrier when the control lever is in said other position.

2. A spool-driving mechanism in a magnetic tape recorder, comprising an electric motor, a shaft projecting from one end of the motor, mounting means for the motor which will permit limited displacement of said motor in such manner that said one end moves in a direction transverse to the axis of the shaft, a rockably mounted control lever for displacing the motor as aforesaid between first and second positions, first and second rotary carriers for spools of magnetic tape, first transmission means for transmitting drive from the motor shaft to the first carrier when the motor is in the first position, whereby the first carrier is driven in a particular direction, and second transmission means which transmit drive from the motor shaft to the second carrier and cause it to rotate in the opposite direction when the motor is in the second position, first and second horizontal wheels which constitute part of the first and second transmission means, respectively, and which have the first and second rotary carriers, respectively, concentrically disposed thereupon, portions of said carriers defining at least three spaced cavities on the lower face of each rotary carrier, portions of said wheels defining at least three cavities on the upper face of each wheel, which cavities are in register with those of the carriers, and at least six balls each of which projects into an associated cavity in a rotary carrier and into the registering cavity in the corresponding wheel, whereby each carrier is coupled to the pertaining wheel by three balls projecting into cavities in each, a respective compression spring in each cavity in each wheel, the spring acting between the wheel and the ball in that cavity to urge the ball upwardly, said springs being loaded to permit the associated balls to be released from the carrier cavities when the force exerted on the carrier approaches one sufficient to break the tape, said released balls rolling on the underside of said carrier and thereby making a characteristic warning sound.

3. A mechanism according to claim 1 and further comprising first and second members constituting a control device by which the control lever can be pushed into said other position, a pivotal connection between the two members, a portion of said second member adapted for the reception of a microphone, a plunger situated beneath said second member so as to be depressed thereby when the microphone is placed upon said portion, a fixed electrical contact member and a moving electrical contact member which is carried by the plunger and which makes contact with the fixed contact member when the plunger is in its elevated position and breaks contact therewith when the plunger is depressed.

References Cited in the file of this patent

UNITED STATES PATENTS

| | | |
|---|---|---|
| 1,789,607 | Steurer | Jan. 20, 1931 |
| 2,369,017 | Camras | Feb. 6, 1945 |
| 2,668,059 | Roberts | Feb. 2, 1954 |
| 2,672,364 | Ragland | Mar. 16, 1954 |